United States Patent Office 2,967,129
Patented Jan. 3, 1961

2,967,129
NEW ERYTHROMYCIN ESTERS

Robert K. Clark, Jr., Lake Bluff, Ill., assignor to Abbott Laboratories, North Chicago, Ill., a corporation of Illinois No Drawing. Filed Oct. 29, 1956, Ser. No. 618,675

10 Claims. (Cl. 167—65)

The present invention relates generally to a novel therapeutic compound and more generally to new esters of erythromycin.

Heretofore the antibiotic erythromycin has not been used widely as an injectable formulation because all of its known forms, including combinations with local anesthetics, cause a great deal of pain which lasts from 24 to 48 hours after being administered intramuscularly by means of a hypodermic needle and the like. It has now been found that erythromycin can be administered intramuscularly by means of a hypodermic needle or the like without causing the usual painful reaction, by administering the erythromycin in the form of an ester of erythromycin having the following general formula:

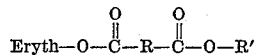

wherein Eryth is a therapeutically active erythromycin radical, R is a radical of dicarboxylic acid, and R' is a radical of an ester group.

In general the novel ester compounds of the present invention are prepared by reacting erythromycin, represented by the formula Eryth-OH, with a dicarboxylic acid compound having one of the carboxylic groups esterified and the other carboxylic group provided with a reaction group which will form an ester with erythromycin, such as an acid chloride group. In the preferred method of preparing compounds of the present invention, a halo formyl (acid halide) derivative of a mono ester of the dicarboxylic acid compound is reacted with erythromycin in accordance with the following general equation:

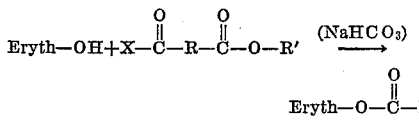

wherein Eryth, R, and R' have the values previously assigned and X is a halogen atom.

The novel compounds of the present invention which are most economically produced have the following general formula:

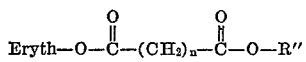

wherein Eryth is a therapeutically active erythromycin radical, R" is a lower alkyl group having between 1 and 4 carbon atoms in the straight chain, and $n$ is an integer from 2 to 10 inclusive.

The following specific examples are for the purpose of illustrating the preferred form of the present invention and are not intended to limit the invention to the precise proportions or reactants used therewith or products produced thereby.

Example I

Erythromycin base (30.0 gm.) is dissolved in 200 ml. of methanol-free dry acetone. Powdered dry sodium bicarbonate (13.0 gm.) is suspended in the acetone solution. Ethyl β-chloroformyl propionate (6.7 gm.) is then mixed with 20 ml. of dry acetone and this solution is added to the erythromycin solution dropwise over a period of about one hour. The reaction is stirred for an additional two hours at room temperature and then allowed to stand overnight. The following day 200 ml. of water is added and the solid precipitated collected by filtration, washed with water, and dried in vacuo. The diester, erythromycin ethyl succinate thus obtained is recrystallized from 120 ml. of acetone and 60 ml. of water to yield 21.5 gm. M.P. 109–110° C. On chemical analysis the said diester hydrated product obtained in the above manner is found to consist of 58.85% C, 8.77% H, 1.60% N, and 30.28% O; as compared with a theoretical analysis of 58.70% C, 8.75% H, 1.59% N, and 30.94% O. After drying 6 hours at 50° C. over phosphorus pentoxide, the anhydrous diester is obtained which on chemical analysis is found to consist of 59.46% C, 8.92% H, and 1.53% N as compared with a theoretical analysis of 59.95% C, 8.71% H, and 1.62% N. The product has a specific rotation of −42.5°, and when assayed by the standard erythromycin plate assay exhibits an erythromycin activity of 712 u./mg.

Example II

Erythromycin base (15.0 gm.) is dissolved in 100 ml. of dry acetone, containing 8.0 gm. of powdered dry sodium bicarbonate. Ethyl-5 chloroformyl caproate (4.5 gm.) is dissolved in 10 ml. of dry acetone and this solution is added dropwise with stirring over a period of one hour. After an additional 2 hours of stirring, the reaction mixture is allowed to stand overnight at room temperature. The following day the mixture is filtered and the insoluble precipitate washed with 50 ml. of acetone and discarded. Water is then added to the filtrate until the solution became hazy. On standing, crystals form which are collected and air dried. The diester product, erythromycin ethyl pimelate, is then purified by dissolving in 60 ml. of acetone and treated with 4.0 gm. of activated charcoal, such as Darco 6–60, while hot. The solution is filtered and water is added to the filtrate until turbid. On standing in ice, crystals form which are collected and dried at 1 mm. over $P_2O_5$ for one day. A yield of 11.0 gm. of the diester product having a M.P. 102–104° C. is obtained. On bioassay, the product shows an erythromycin activity of 400 u./mg. and a specific rotation [α]—74.4°. On chemical assay the product is found to contain 60.93% C, 9.00% H, and 1.57% N as compared with a theoretical analysis of 61.12% C, 8.97% H, and 1.52% N.

Example III

Erythromycin (15 gm.) is dissolved in 100 ml. of methanol free dry acetone, and 8.0 gm. of dry powdered sodium bicarbonate is suspended in the mixture. Ethyl-7-chloroformyl caprylate (4.8 gm.) is dissolved in 10 ml. of dry acetone and the mixture is added dropwise with stirring to the erythromycin solution over the period of one hour. After an additional 2 hours of stirring, the reaction is allowed to stand overnight at room temperature. The following day the reaction is filtered and the insoluble material washed with 50 ml. of acetone. The insoluble material is discarded. The filtrate and wash are combined and water added until turbidity. On scratching and cooling, the oil crystallizes and the crystals of erythromycin ethyl azelate are collected and dried. A yield 9.3 gm. of the crystalline product having a M.P. of 83–85° C. is obtained. On chemical analysis the product is found to contain 61.78% C, 9.00% H, 1.55% N as compared with a theoretical analysis of 61.86% C, 9.13% H, and 1.50 N.

Example IV

A pharmaceutical embodiment of the compound of the present invention which utilizes a local anesthetic is as follows:

| | G. |
|---|---|
| Erythromycin ethyl succinate (712 u./mg.) | 7.05 |
| Benzyl alcohol | 0.9 |
| n-Butyl p-aminobenzoate (Butesin) | 2.0 |
| Polyethylene glycol-400, q.s. 100 cc. | |

The above ingredients are mixed to form a stable therapeutically active solution of the said erythromycin ester having an erythromycin activity equivalent to 50 u./ml. When the foregoing composition is administered intramuscularly by means of a hypodermic needle in the conventional manner, the patient generally feels no pain and in these instances where any pain is felt, the duration is for only about 5 minutes. The latter is in sharp contrast with the results produced by any of the previously known injectable formulations of erythromycin which even in combination with the same local anesthetic cause intense pain for a period of about 24 to 48 hours.

The reason for the surprising absence of the usual painful reaction following the injection of erythromycin, a result which heretofore was thought to be inherent with the erythromycin molecule, are not entirely clear, but it is possible that the unexpected result is due to the unusual stability and relatively limited solubility of the compounds of the present invention in an aqueous solution or suspension and particularly in a medium such as in muscle tissue.

It should be understood that in addition to the succinate, pimelate, and azelate diesters specifically shown, the present invention also includes the similar diester of other closely related saturated aliphatic dicarboxylic acids, such as glutaric acid, adipic acid, and sebacic acid; the similar diesters of the unsaturated aliphatic dicarboxylic acids, such as fumaric acid, glutaconic acid, and allyl succinic acid; and the similar diesters of the aromatic dicarboxylic acids, such as phthalic acid. Also other esterifying groups can be used in the present invention besides the ethyl group specifically shown in order to impart particular properties to the diester products, including such groups as the methyl, propyl and butyl lower alkyl groups and the higher alkyl groups, such as the octyl and decyl groups.

Others may readily adapt the invention for use under various conditions of service, by employing one or more of the novel features disclosed or equivalents thereof. As at present advised with respect to the apparent scope of my invention, I desire to claim the following subject matter.

I claim:

1. An ester of erythromycin having the following general formula:

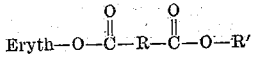

wherein Eryth is a therapeutically active erythromycin radical, R is a radical of dicarboxylic acid, and R' is an alkyl group having from 1 to about 10 carbon atoms.

2. A diester of an aliphatic dicarboxylic acid having the following general formula:

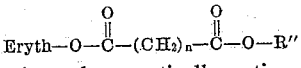

wherein Eryth is a therapeutically active erythromycin radical, R'' is a lower alkyl group having between 1 and 4 carbon atoms, and $n$ is an integer from 2 to 10 inclusive.

3. An erythromycin alkyl diester of an aliphatic dicarboxylic acid wherein the alkyl group has from 1 to about 10 carbon atoms.

4. An erythromycin lower alkyl succinate.

5. The compound erythromycin ethyl succinate.

6. An erythromycin lower alkyl pimelate.

7. The compound erythromycin ethyl pimelate.

8. An erythromycin lower alkyl azelate.

9. The compound erythromycin ethyl azelate.

10. A therapeutic composition comprising an erythromycin alkyl diester of a dicarboxylic acid in a pharmaceutical carrier wherein the alkyl group has from 1 to about 10 carbon atoms.

References Cited in the file of this patent

UNITED STATES PATENTS

| 2,653,899 | Bunch et al. | Sept. 29, 1953 |
|---|---|---|
| 2,806,024 | Bird et al. | Sept. 10, 1956 |
| 2,857,312 | Stephens | Oct. 21, 1958 |

FOREIGN PATENTS

| 753,742 | Great Britain | Aug. 1, 1956 |
|---|---|---|
| 506,308 | Canada | Oct. 5, 1954 |